May 2, 1950  M. I. TAYLOR  2,506,118
CLUSTER CONTROLLER
Filed Jan. 13, 1947
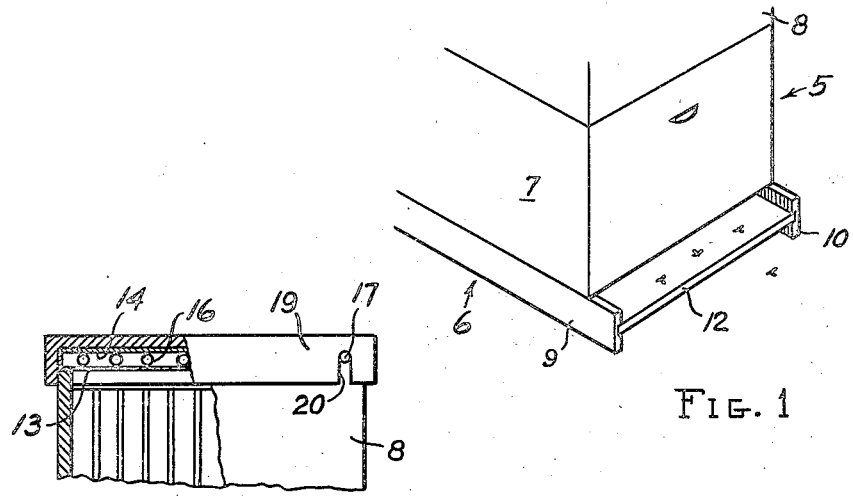
Fig. 1
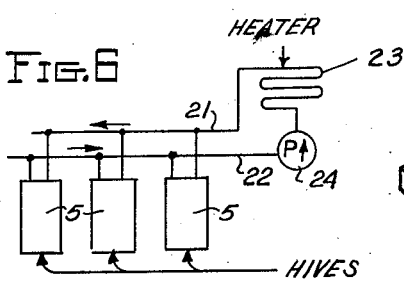
Fig. 5
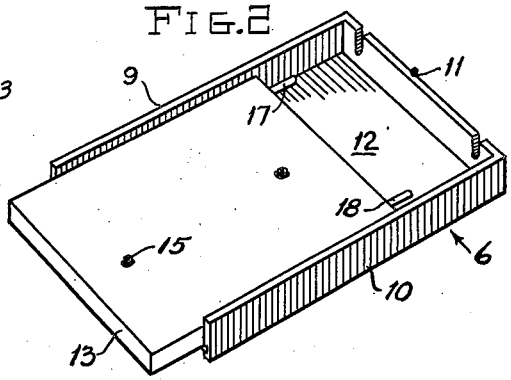
Fig. 2
Fig. 6
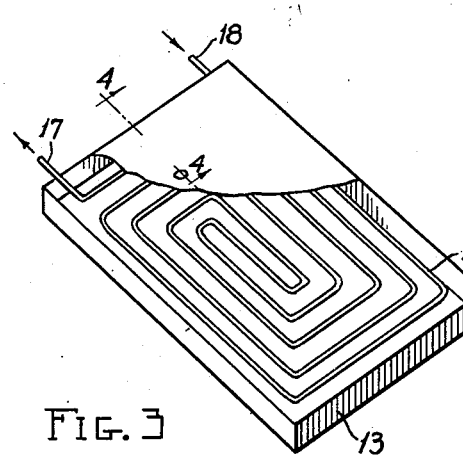
Fig. 3
Fig. 4
Inventor
MERRITT I. TAYLOR
By Elizabeth Newton Dew
Attorney Patented May 2, 1950

2,506,118

UNITED STATES PATENT OFFICE 2,506,118

CLUSTER CONTROLLER

Merritt I. Taylor, Richmond, Va.

Application January 13, 1947, Serial No. 721,699

7 Claims. (Cl. 6—1)

This invention relates to improvements in bee hives and, more particularly, to an improved hive for keeping a colony of bees therein alive and healthy during the winter with minimum loss of energy and for controlling the size of the cluster. It is well known that honey bees are unable to withstand extremely low atmospheric temperatures. During the wintering period, the bees form a cluster within the hive extending into and about the combs. When the inside temperature is relatively high, say, 58° F. or 57° F., the cluster is large and loosely formed so that the bees therein may move about with relative freedom and each insect is able to get to the combs to eat, while the cluster may move to fresh stores of honey when necessary. However, when the temperature inside the hive becomes too low, the cluster contracts in size as the bees huddle closer together to keep warm. As a result, the freedom of movement of the bees or insects is restricted so that large numbers may be unable to get to the combs to eat, while the cluster is unable to move to fresh stores of honey or food. As a result, large numbers of the bees may starve while others are greatly weakened from lack of food. Thus the colony may emerge in the spring in decimated and emaciated condition. Furthermore, excessive cold in the hives after the new broods have emerged in the spring, may cause large numbers of the young bees to freeze. However, if the cluster is kept warm it will remain large enough to cover the young broods and thus keep them warm and healthy.

At the present it is the usual procedure of bee keepers to pack their hives at a date generally coincident with the average date of the first frost of the locality. While hives may be packed singly, it is a more common procedure to group them in back-to-back relation in units of four hives per unit. A box or container is formed to accommodate the group of hives. This box is large enough to provide space between the outer hive walls on all four sides of the unit as well as on top and bottom. The hives are then set upon spacers or sleepers on the floor of the case and heat insulating material such as sawdust, wood shavings, or ground cork, is then used to fill the space between the hives and the top, bottom and side walls of the case. A restricted opening is provided so that the bees may emerge on warm days. The lower the average winter temperature for the locality, the thicker the packing should be.

Colonies of bees under the method of packing just described, manage to survive in spite of the large quantities of moisture which collect in the hives. However, packing is expensive, laborious and requires great care and attention if the loss of a substantial percentage of the colony is to be avoided. I have found that by the use of a relatively simple and inexpensive heating unit for each hive, the foregoing difficulties may be avoided.

Accordingly, among the more important objects of my invention are (1) the provision of a heating device for hives which will enable the control of the size of the aforesaid cluster and which will eliminate the need for packing and reduce the material and labor necessary with packed hives; (2) the provision of a cluster control device for a hive that may be either built into the hive or added as an attachment to existing hives; (3) the provision of a heater for hives which uses the principle of radiant energy with its attendant healthful, energy-saving conditions and low cost; (4) the provision of a panel heater that may be placed in the floor, walls or inner cover of the hive; (5) the provision of a heating system for hives that may be quickly controlled in accordance with the ambient temperature; (6) the provision of a cluster control device which is easy and inexpensive to build, simple to put into and to remove from place, and one which may be easily and quickly connected with a service line or header; (7) the provision of a heated hive that reduces the cost and labor or servicing while, at the same time, increases the output of honey per colony of bees; and (8) the provision of a temperature control device to prevent excessive contraction of the cluster during brood rearing in the spring, with its consequent loss of brood and reduction of energy of the colony, commonly known as "spring-dwindling." Other objects and advantages of my invention will become apparent as the description proceeds.

In the drawing:

Figure 1 is a perspective view showing the front lower portion of a standard hive to which my invention may be added.

Figure 2 is a view showing my panel heater unit slid part way into the bottom board of a hive.

Figure 3 is a perspective view of my panel heater unit with top partly broken away to show a preferred form of heating coils.

Figure 4 is an enlarged detail cross section of a portion of the heater unit to show one manner of securing the coil in place and taken substantially on a plane indicated by the line 4—4, Figure 3.

Figure 5 is a detail view of the top portion of a hive, partly in section to show the manner in which a heating panel may be substituted for the usual inner cover, and Figure 6 is a diagrammatic view showing how a plurality of hives may be supplied from a single hot water heating and circulating system.

Referring in detail to the drawing where like numerals identify corresponding parts throughout, 5 indicates generally a hive having a bottom board 6 on which rests a lower section 7 having four side walls. Other like sections such as 8 may rest on section 7. The bottom board 6 usually consists of side walls 9 and 10, Figure 2, and a rear end wall 11, all rabbeted to receive a floor 12. The rear wall 11 coincides with and is coplanar with, the rear walls of sections 7 and 8. However, the side walls 9 and 10 are longer than the corresponding hive section walls so that the forwardly projecting part of floor 12 forms a landing for the bees. The comb frames are supported in each section so that bees may enter the hive between the front lower edge of section 7 and floor 12 and thence proceed upward between frames to the comb being completed.

The heater forming the subject of my invention includes a casing 13 formed of relatively light gauge galvanized sheet steel, plastic or other materials. This casing is conveniently formed from a rectangular piece of metal having its sides turned down and soldered, welded or otherwise joined at their meeting edges. The lower side of the casing is closed by a sheet of insulating board 14 which may be secured in place by bolts 15, Figure 4, or other fastening means (not shown), after the coil has been placed in position for fastening.

The heating coil 16 is preferably formed from a single length of one-eighth inch copper tubing bent as shown by way of example in Figure 3. While numerous other shapes and forms of coil may be used, I have found that the one shown is particularly efficient and lends itself to easy, simple, yet firm attachment to the housing. The ends 17 and 18 of coil 16, project through notches in the rear wall of casing 13 and are threaded for coupling to adjacent supply and return headers of a hot water supply line. The bolts 15 act to secure both the coil and bottom board 14 in place. When the rear wall of the casing is notched in a manner similar to that shown for the rear base board wall 11, Figure 2, the heating unit may be readily assembled and disassembled for cleaning and repair.

It is intended that these radiant panels or heating units shall be connected with supply and return headers 21 and 22, respectively, from an automatic closed forced hot water heating system, supplied by a boiler or heater 23, as shown diagrammatically in Figure 6. Circulation will preferably be secured by a booster or centrifugal pump 24 and all exposed piping will be heat insulated. It is contemplated that a row of hives will be supplied from a pair of headers extending along their rear walls as shown in Figure 6. In use, where the heating units or panels are to be placed within the bottom boards of the hives, a unit is simply inserted in each hive, as in Figure 2 where a unit is shown placed part way into position. Thereafter, the ends of each coil 16 are coupled to the respective headers 21 and 22, Figure 6, after which they are ready for use. It will be understood that the panels may be equally as well adapted for hives having the entrance at the side. A clearance of about three-eighths inch will remain between the top of the panel and the bottom edge of the hive entrance to provide ventilation and to permit the bees to emerge on warm days.

In Figure 5 is shown an arrangement wherein a heating panel, which may be in all respects similar to the one shown at Figure 3, replaces the usual inner cover of the hive. In this case, the rear wall of top 19 is notched as at 20, to permit the ends 17 and 18 of the coil to pass therethrough. In use, it is merely necessary to lift off cover 19, remove the inner cover, and replace the same with a heating panel, then replace the top. While I have shown the panels in the form of an attachment for existing hives, it will be clear that hives may be built with heating panels permanently built into place in the walls, top, or bottom thereof, ready for connection with hot water supply lines. It is also contemplated that the hot water coils may be replaced by electric heater or coil elements, in which case the panels would be wired for plugging in to receptacles connected with a source of current. Thermostatic control responsive to the outdoor temperature would be provided as in the case of water.

As a result of my invention, the temperature within the hives may be automatically controlled to provide radiant heat in the proper amounts and at the proper times necessary to keep the bee clusters from contracting excessively. The panels control the inside surface temperature of a component part of the hive and thereby cause the adjacent and opposed surfaces to closely approximate the panel temperature. Thus the clusters are maintained at normal size, wherein all bees are able to move about with relative freedom and get an adequate supply of honey. The bee brood, before emerging, is protected against the dangers of freezing, and the entire colony emerges in the spring in a healthy and vigorous condition ready for honey-gathering.

While I have shown and described the preferred form of my invention as now known to me, various modifications and substitutions will occur to those skilled in the art, after a study of the foregoing specification. Hence I desire that the disclosure be taken in an illustrative, rather than in a limiting sense; and it is my desire to reserve all such changes as fall within the scope of the sub-joined claims.

Having now fully disclosed the invention, what I claim and desire to secure by Letters Patent is:

1. In a bee-hive having top, bottom and side walls and a radiant heating unit adapted to be secured within said hive to one said wall, said unit comprising a closed housing, and a heat-exchange means fixed within said housing.

2. The combination with a bee-hive having side walls, roof and floor, one said wall having its lower edge spaced from said floor to form an entrance for bees, of a heating unit adapted to be inserted through said entrance and to rest on said floor, said unit including a generally flat hollow housing and a heating coil secured within said housing, said coil comprising a length of pipe forming convolutions and having terminals externally of said housing for connection with an external source of heating fluid.

3. A bee-hive in the general form of a parallelopiped having four upright side walls, a floor and a roof, one said wall having its lower edge spaced from said floor to form an entrance, a heating unit for said hive and comprising a housing having a height and width slightly less than the corresponding dimensions of said entrance and a length slightly less than the inside length of said hive, and a coil of heat-exchange tubing within said housing, said tubing having terminals projecting therefrom and adapted to project through and fit respective openings in the rear walls of said hive as said unit is inserted through said entrance into the hive the convolutions of said coil lying in a single plane.

4. A cluster control device for a bee hive comprising a radiant heating panel adapted to be positioned within said hive closely adjacent one wall thereof, said panel including a flat, relatively thin casing, a bottom, and a hot water heating coil in said casing and enclosed therein by said bottom, said coil having coplanar convolutions and terminating in ends extending through one side wall of said casing, said ends being adapted for connection with respective supply and return hot water headers, whereby the temperature and the size of a bee cluster within said hive, may be controlled.

5. In a cluster control device for a bee hive having top, bottom, and side walls, one said side wall having its lower edge cut away to form an entrance, a radiant heating panel comprising a flat casing having a hot water heating coil therein, said coil having its ends projecting parallel and rearwardly through one end wall of said casing, said casing having a height less than the vertical dimension of said entrance, whereby said panel may be slid into position therethrough with said ends projecting through respective apertures in the wall of said hive opposite said entrance.

6. The combination with a bee hive having a bottom, side walls, and a removable top adapted to fit snugly over and about the upper edge portions of said walls, of a radiant heating panel in the general form of a parallelopiped supported from said walls adjacent and closely beneath said top within said hive.

7. The combination with a bee hive having a bottom, side walls, and a removable top, of a radiant heating panel positioned within said hive in upright position closely adjacent one said side wall, said panel including a coil adapted to receive and radiate heating energy, and connections to said panel through said one side wall to an external source of heating energy.

MERRITT I. TAYLOR.

REFERENCES CITED

The following references are of record in the file of this patent:

UNITED STATES PATENTS

| Number | Name | Date |
|---|---|---|
| 702,833 | Vogeler | June 17, 1902 |
| 1,800,150 | Musgrave et al. | Apr. 17, 1931 |
| 1,847,573 | Rupp | Mar. 1, 1932 |

OTHER REFERENCES

The ABC and XYZ of Bee Culture, by A. I. and E. R. Root, page 77, The A. I. Root Company, Medina, Ohio. (Copy in Div. 5.)